United States Patent [19]

Ishizaka

[11] Patent Number: 4,831,247

[45] Date of Patent: May 16, 1989

[54] LIGHT BEAM SCANNING APPARATUS EMPLOYING ROTATING POLYGON MIRROR

[75] Inventor: Hideo Ishizaka, Kanagawa, Japan

[73] Assignee: Fuji Photo Film Co., Ltd., Kanagawa, Japan

[21] Appl. No.: 10,527

[22] Filed: Feb. 3, 1987

[30] Foreign Application Priority Data

Feb. 3, 1986 [JP] Japan .................. 61-21727

[51] Int. Cl.⁴ .............................. H04N 1/04
[52] U.S. Cl. ..................... 250/205; 250/236; 358/293
[58] Field of Search ........ 250/205, 235, 236; 346/108, 160; 350/6.7, 6.8; 358/285, 293, 296, 300, 206, 208

[56] References Cited

U.S. PATENT DOCUMENTS

| | | | |
|---|---|---|---|
| 4,370,678 | 1/1983 | Kitamura | 358/293 |
| 4,441,126 | 4/1984 | Greenig et al. | 358/300 |
| 4,566,016 | 1/1986 | Masuda | 346/108 |
| 4,647,981 | 3/1987 | Froelich | 250/236 |
| 4,710,779 | 12/1987 | Funaki et al. | 250/205 |
| 4,757,191 | 7/1988 | Shimada et al. | 250/205 |

*Primary Examiner*—Edward P. Westin
*Attorney, Agent, or Firm*—Sughrue, Mion, Zinn, Macpeak & Seas

[57] ABSTRACT

A light beam scanning apparatus wherein a light beam deflected by a rotating polygon mirror is scanned on a scanning surface in a main scanning direction, and the scanning surface is moved with respect to the light beam in a sub-scanning direction, comprises a reference beam emitting system for generating a reference beam of a predetermined intensity and making for the reference beam impinge upon the rotating polygon mirror. The apparatus also comprises a photodetector for measuring the intensity of the reference beam deflected by the rotating polygon mirror, and a control circuit for receiving the output of the photodetector and adjusting the intensity of the light beam in accordance with the level of the intensity of the reference beam which is represented by the output of the photodetector.

6 Claims, 2 Drawing Sheets

LIGHT BEAM SCANNING APPARATUS EMPLOYING ROTATING POLYGON MIRROR

BACKGROUND OF THE INVENTION

1. Field of the Invention

This invention relates to a light beam scanning apparatus. This invention particularly relates to a light beam scanning apparatus free from occurrence of image density nonuniformity caused by variations in surface reflectivity of a rotating polygon mirror used for light beam scanning.

2. Description of the Prior Art

Light beam scanning apparatuses wherein a light beam is deflected and scanned by a light deflector in a main scanning direction on a scanning surface, and at the same time the scanning surface is moved with respect to the light beam in a sub-scanning direction approximately normal to the main scanning direction, have heretofore been widely used, for example, in scanning recording apparatuses and scanning read-out apparatuses. In the light beam scanning apparatuses, a rotating polygon mirror is employed in many cases as the light deflector. The rotating polygon mirror is advantageous from the viewpoint of scanning stability over other light deflectors such as a galvanometer mirror.

However, in general, the rotating polygon mirror is disadvantageous in that surface reflectivity differs slightly among the mirror surfaces, and therefore the intensity of the light beam actually scanning on the scanning surface differs among the mirror surfaces even though the same intensity light beam is made to impinge upon the respective mirror surfaces of the rotating polygon mirror. When the intensity of the scanning beam changes among the mirror surfaces of the rotating polygon mirror, density nonuniformity arises with the recorded image in the case of the light beam scanning recording apparatus. Also, in the case of the light beam scanning read-out apparatus, distortion arises with the read-out image signal, and consequently, density nonuniformity arises with the image reproduced by use of the read-out image signal. The variations in the surface reflectivity arise comparatively markedly among the mirror surfaces of the rotating polygon mirror, and often arise slightly even in a single mirror surface. Also, when the surface reflectivity varies locally in a single mirror surface, the same problems as mentioned above arise.

SUMMARY OF THE INVENTION

The primary object of the present invention is to provide a light beam scanning apparatus free from changes in intensity of the scanning light beam caused by variations in the surface reflectivity of the rotating polygon mirror.

Another object of the present invention is to provide a light beam scanning apparatus suitable for accomplishing light beam scanning recording or read-out with a very high accuracy.

The present invention provides a light beam scanning apparatus wherein a light beam deflected by a rotating polygon mirror is scanned on a scanning surface in a main scanning direction, and the scanning surface is moved with respect to the light beam in a sub-scanning direction, the light beam scanning apparatus comprising:

(i) a reference beam emitting system for generating a reference beam of a predetermined intensity and making said reference beam to impinge upon said rotating polygon mirror, (ii) a photodetector for measuring the intensity of said reference beam deflected by said rotating polygon mirror, and (iii) a control means for receiving the output of said photodetector and adjusting the intensity of said light beam in accordance with the level of the intensity of said reference beam which is represented by the output of said photodetector.

With the light beam scanning apparatus in accordance with the present invention, since changes in light amount of the scanning beam caused by variations in the surface reflectivity of the rotating polygon mirror used for reflecting and deflecting the scanning beam can be prevented reliably, it becomes possible to conduct light beam scanning recording or read-out with a very high accuracy.

Control of the intensity of the light beam by the control means may be conducted for each mirror surface of the rotating polygon mirror on the basis of the intensity of the reference beam measured for each mirror surface, or may be conducted continuously on the basis of the intensity of the reference beam measured continuously. In the former case, changes in the intensity of the scanning beam caused by variations in the surface reflectivity of the rotating polygon mirror are eliminated in a unit of the mirror surface of the rotating polygon mirror. In the latter case, even slight changes in the intensity of the scanning beam caused by local variations in the surface reflectivity on a single mirror surface are eliminated.

DESCRIPTION OF THE PREFERRED EMBODIMENTS

The present invention will hereinbelow be described in further detail with reference to the accompanying drawings.

Figure 1:
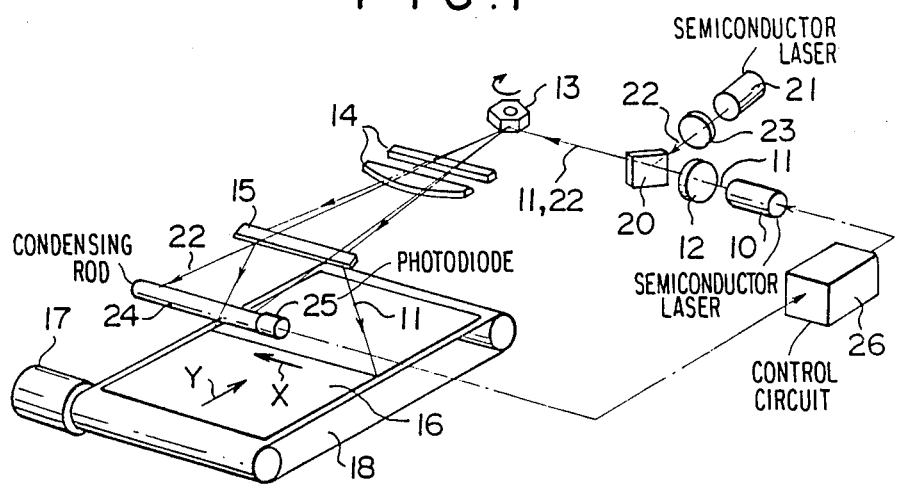
FIG. 1 is a perspective view showing an embodiment of the light beam scanning apparatus in accordance with the present invention.

Referring to FIG. 1, a laser beam 11 emitted by a semiconducto laser 10 acting as a scanning beam generation means is collimated by a collimator lens 12 and made to impinge upon a rotating polygon mirror 13. The laser beam 11 is reflected and deflected by the rotating polygon mirror 13, made to pass through a converging lens 14 which is usually constituted by an f$\theta$ lens, and reflected by a long mirror 15 so that the laser beam 11 scans a scanning material 16 in a main scanning direction as indicated by the arrow X. At the same time, the scanning material 16 is moved by an endless belt 18, which is operated by a drive device 17, in a subscanning direction as indicated by the arrow Y approximately normal to the main scanning direction as indicated by the arrow X. As a result, the scanning material 16 is two-dimensionally scanned by the laser beam 11. This embodiment is fabricated as a light beam scanning recording apparatus. Therefore, in this case, the scanning material 16 is a recording medium such as a photographic film, and the laser beam 11 is modulated with an image signal as described below.

Figure 2:
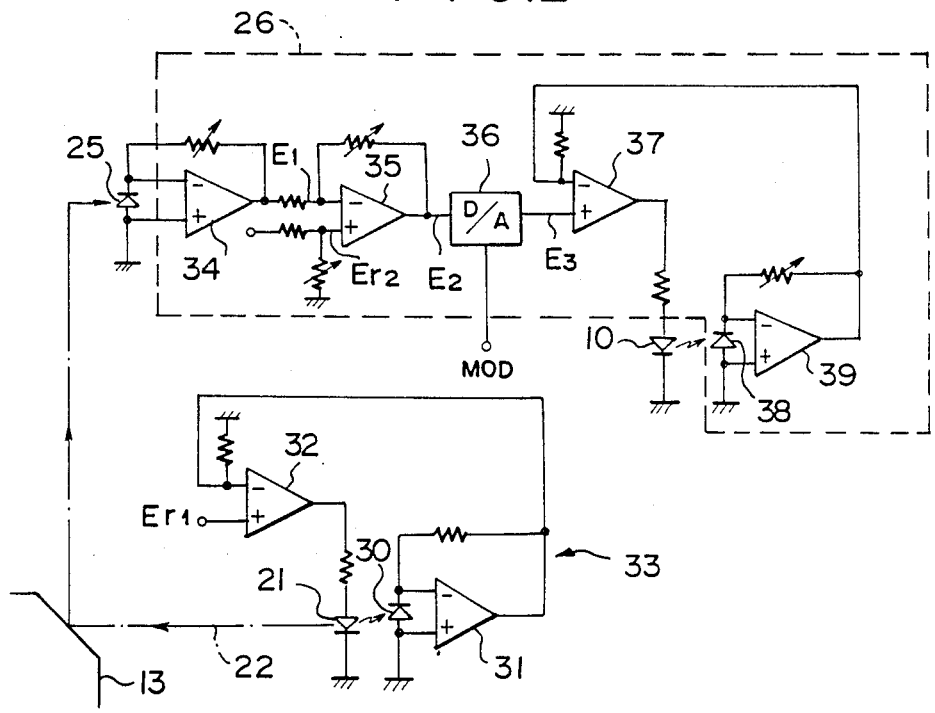
FIG. 2 is a circuit diagram showing the electronic circuitry in the embodiment of FIG. 1.

In the case where surface reflectivity differs among the respective mirror surfaces of the rotating polygon mirror 13, the intensity of the laser beam 11 scanning on the scanning material (recording medium) 16 changes among the mirror surfaces. When changes in the intensity of the laser beam 11 arise, density nonuniformity arises with the image recorded on the recording medium 16. Elimination of changes in the intensity of the scanning beam will be described below. A light beam coalescing means 20 constituted by a semitransparent mirror, a polarization beam splitter, or the like is disposed in the optical path of the laser beam 11 between the collimator lens 12 and the rotating polygon mirror 13. A reference beam emitting semiconductor laser 21 is disposed on the lateral side of the light beam coalescing means 20. A reference beam 22 emitted by the reference beam emitting semiconductor laser 21 and collimated by a collimator lens 23 is coalesced with the laser beam 11 by the light beam coalescing means 20. The reference beam emitting semiconductor laser 21 is disposed so that the optical axis of the reference beam 22 is slightly deviated from the optical axis of the laser beam 11. Therefore, the reference beam 22 reflected and deflected by the rotating polygon mirror 13 passes outside of the mirror 15 and impinges upon a condensing rod 24 which is coupled with a photodiode 25 acting as a photodetector. The semiconductor laser 10 is controlled by a control circuit 26, which receives the output of the photodiode 25, and operated so that no change arises with the intensity of the laser beam 11 reflected and deflected as mentioned above. The control operation will hereinbelow be described with reference to FIG. 2 showing in detail the electric circuitry of the control circuit 26. The reference beam emitting semiconductor laser 21 is operated as long as an image is recorded with the laser beam 11. The reference beam emitting semiconductor laser 21 is controlled by an automatic power control (APC) circuit 33 comprising a photodiode 30, a current-voltage converter 31 and a differential amplifier 32 incorporated in the case of the semiconductor laser 21. The intensity of the reference beam 22 is maintained at a predetermined value based on a reference voltage Er1. As mentioned above, the reference beam 22 is reflected and deflected by a rotating polygon mirror 13, and the reflected reference beam 22 is detected by the phototodiode 25. The output of the photodiode 25 is converted by the current-voltage converter 34 into a voltage signal E1, which is then fed to the "−" (minus) side of the differential amplifier 35. The differential amplifier 35 comprises a reference voltage Er2 fed to the "+" (plus) side thereof with the voltage signal E1 representing the intensity of the reference beam 22, and generates an output E2 in accordance with the difference between the reference voltage Er2 and the voltage signal E1. The output E2 becomes small as the level of the voltage signal E1 is high (i.e. as the intensity of the reference beam 22 is large), and becomes large as the level of the voltage signal E1 is low (i.e. as the intensity of the reference beam 22 is small). The output E2 is fed to the multiplier D/A converter (i.e. the multiplication type D/A converter) 36. The multiplier D/A converter 36 receives a digital modulation signal MOD representing image information, and sends an analog voltage output E3 in accordance with the modulation signal MOD to the "+" side of a differential amplifier 37 which constitutes the APC circuit of the semiconductor laser 10 together with a photodiode 38 and a current-voltage converter 39 incorporated in the case of the semiconductor laser 10. Since the drive current for the semiconductor laser 10 is controlled by the APC circuit in accordance with the output E3, the intensity of the laser beam 11 emitted by the semiconductor laser 10 is modulated with the modulation signal MOD, and the image is recorded on the recording medium 16.

The output E3 of the multiplier D/A converter 36 is equal to the product of the modulation signal MOD with the output E2 of the differential amplifier 35. Since the output E2 is correlated with the intensity of the reference beam 22 as mentioned above, the intensity of the laser beam 11 is increased when the reference beam 22 (and consequently the laser beam 11) is reflected and deflected by a mirror surface of the rotating polygon mirror 13 having low surface reflectivity, and is decreased when the laser beam 11 is reflected and deflected by a mirror surface of the rotating polygon mirror 13 having high surface reflectivity. Therefore, the intensity of the laser beam 11 scanning on the recording medium 16 is prevented from changing due to variations in the surface reflectivity of the rotating polygon mirror 13. In this embodiment, operation control of the semiconductor laser 10 by the output E3 of the multiplier D/A converter 36 is conducted as long as the semiconductor laser 10 is operated. Therefore, it is possible to prevent changes in the intensity of the laser beam 11 caused by variations in the surface reflectivity among the mirror surfaces of the rotating polygon mirror 13, and even slight variations in the surface reflectivity which may be present on a single mirror surface.

Figure 3:
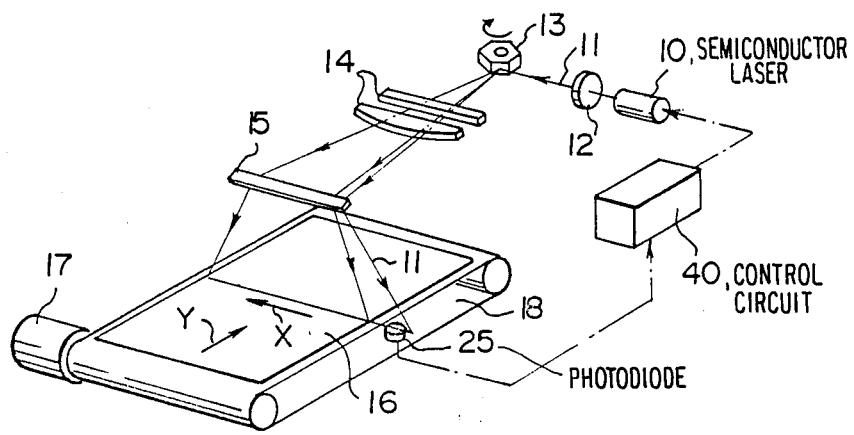
FIG. 3 is a perspective view showing another embodiment of the light beam scanning apparatus in accordance with the present invention.
Figure 4:
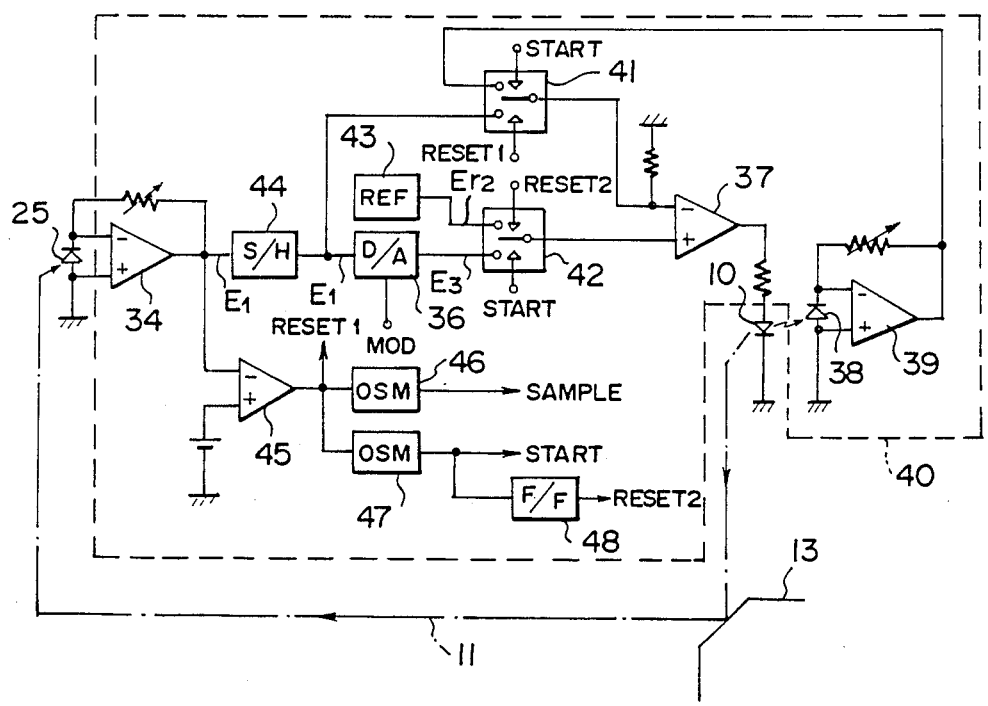
FIG. 4 is a circuit diagram showing the electronic circuitry in the embodiment of FIG. 3.

Another embodiment of the light beam scanning apparatus in accordance with the present invention will hereinbelow be described with reference to FIGS. 3 and 4. In FIGS. 3 and 4, similar elements are numbered with the same reference numerals with respect to FIGS. 1 and 2. As shown in FIG. 3, the photodiode 25 is disposed on the lateral side of the recording medium 16 for detecting the intensity of the laser beam 11 outside of the effective scanning region (prior to the effective scanning). In a control circuit 40 shown in FIG. 4, before image recording is conducted (i.e. when the laser beam 11 is outside of the effective scanning region), an analog switch 41 is maintained in the open condition, and an analog switch 42 is adjusted to the condition for connecting a reference voltage generator 43 with the "+" side of the differential amplifier 37. Therefore, at this stage, the semiconductor laser 10 is operated by a predetermined current corresponding to the reference voltage Er2 generated by the reference voltage generator 43. As the rotating polygon mirror 13 is rotated, the laser beam 11 impinges upon the photodiode 25, and the intensity of the laser beam 11 is detected by the photodiode 25. Accordingly, the voltage signal E1 representing the intensity of the laser beam 11 is generated by the current-voltage converting circuit 34. The voltage signal E1 is fed to a sample holding circuit 44 and a comparator 45. Upon receiving the voltage signal E1, the comparator 45 generates a RESET1 pulse. By the leading edge of the RESET1 pulse, the analog switch 41 is set to the condition for connecting the "−" side of the differential amplifier 37 with the sample holding circuit 44. At the same time, a SAMPLE pulse is generated by a one-shot multivibrator 46, and the sample holding circuit 44 is set to the sampling condition by the SAM- PLE pulse. In this condition, since the voltage signal E1 representing the intensity of the laser beam 11 reflected and deflected by the rotating polygon mirror 13 is fed to the "−" side of the differential amplifier 37, the semiconductor laser 10 is controlled so that the predetermined beam intensity is obtained on the photodiode 25, i.e. on the recording medium 16, regardless of the surface reflectivity of each mirror surface of the rotating polygon mirror 13. Therefore, a larger current is fed to the semiconductor laser 10 as the surface reflectivity of the rotating polygon mirror 13 is lower, and the intensity of the laser beam 11 reflected by the rotating polygon mirror 13 is maintained constant regardless of the surface reflectivity of the respective mirror surfaces of the rotating polygon mirror 13. In this manner, the voltage signal E1 stabilized at a predetermined value is fed to the sample holding circuit 44. When the predetermined time set at the one-shot multivibrator 46 elapses, the SAMPLE pulse is turned off, and the sample holding circuit 44 holds the stabilized value of the voltage signal E1. The E1 value thus held is sent as the maximum voltage to the REF terminal of the multiplier D/A converter 36.

When the deflected laser beam 11 is deviated from the photodiode 25, since the "−" side input to the comparator 45 becomes smaller than the predetermined value, the RESET1 pulse is turned off. Upon receiving the trailing edge of the RESET1 pulse, a one-shot multivibrator 47 generates a START pulse, and turns off a RESET2 pulse via a flip-flop 48. As a result, the analog switches 41 and 42 are set to the conditions for feeding the output of the current-voltage converter 39 and the voltage output E3 of the multiplier D/A converter 36 respectively to the "−" and "+" sides of the differential amplifier 37. Therefore, in the same manner as in the embodiment of FIG. 1, a drive current corresponding to the modulation signal MOD fed to the multiplier D/A converter 36 is supplied to the semiconductor laser 10, and the intensity of the laser beam 11 is modulated. Also in this case, the output E3 of the multiplier D/A converter 36 is equal to the product of the modulation signal MOD with the held E1 value, and therefore the laser beam 11 is modulated by preventing changes in the intensity thereof caused by variations in the surface reflectivity among the mirror surfaces of the rotating polygon mirror 13.

When the predetermined time for which the laser beam 11 scans the effective scanning region elapses after the START pulse is generated, the one-shot multivibrator 47 turns off the START pulse, and generates the RESET2 pulse via the flip-flop 48. As a result, the analog switch 41 is set to the open condition for readying for the next beam scanning. On the other hand, the analog switch 42 is set to the condition for connecting the reference voltage generator 43 to the "+" side of the d fferential amplifier 37.

By the repetition of the aforesaid operations, the value of the voltage signal E1 fed to the multiplier D/A converter 36 is changed for each of the mirror surfaces of the rotating polygon mirror 13, and adverse effects of variations in the surface reflectivity among the mirror surfaces are eliminated. In this embodiment, since the adverse effects of variations in the surface reflectivity are eliminated for each mirror surface of the rotating polygon mirror 13 as mentioned above, it is not possible to eliminate slight variations in the surface reflectivity on a single mirror surface. However, this embodiment is advantageous in that the scanning beam emitting system can be utilized also as the reference beam emitting system.

The light beam scanning apparatus in accordance with the present invention is applicable also to the light beam scanning read-out apparatus. In this case, the multiplier D/A converters 36, 36 in the control circuits 26 and 40 in FIGS. 2 and 4 are omitted.

I claim:

1. A light beam scanning apparatus wherein a light beam deflected by a rotating polygon mirror is scanned on a scanning surface in a main scanning direction, and the scanning surface is moved with respect to the light beam scanning apparatus comprising:
   (i) a reference beam emitting system for generating a reference beam of a predetermined intensity along an optical axis different from that of said light beam and making said reference beam to impinge upon said rotating polygon mirror,
   (ii) a photodetector for measuring the intensity of said reference beam deflected by said rotating polygon mirror away from said scanning surface, and
   (iii) a control means for receiving the output of said photodetector and adjusting the intensity of said light beam in accordance with the level of the intensity of said reference beam which is represented by the output of said photodetector.

2. An apparatus as defined in claim 1 wherein the adjustment of the intensity of said light beam by said control means is conducted continuously on the basis of the continuously measured reference beam intensity.

3. An apparatus as defined in claim 1 wherein the adjustment of the intensity of said light beam by said control means is conducted for each of mirror surfaces of said rotating polygon mirror on the basis of the reference beam intensity measured for each of said mirror surfaces.

4. A apparatus as defined in claim 1, wherein said control means comprises:
   first automatic power control circuitry for adjusting an intensity of said reference beam prior to reflection of said reference beam by said rotating polygon mirror; and
   second automatic power control circuitry, receiving a signal substantially corresponding to an intensity of said reference beam after reflection from said rotating polygon mirror, and for modulating intensity of said light beam in accordance with said signal.

5. An apparatus as defined in claim 4, further comprising a condensing rod, positioned above said scanning surface, and connected to said photodetector, said reference beam impinging on said condensing rod to provide an input to said photodetector.

6. A light beam scanning apparatus wherein a light beam deflected by a rotating polygon mirror is scanned on a scanning surface in a main scanning direction, and the scanning surface is moved with respect to the light beam in a sub-scanning direction, the light beam scanning apparatus comprising:
   (i) a photodetector positioned outside an effective scanning region within which a material to be scanned is positioned, said light beam striking said photodetector in accordance with rotation of said rotating polygon mirror, said photodetector providing an output accordingly, and
   (ii) a control means for receiving the output of said photodetector and adjusting the intensity of said light beam in accordance with said output of said photodetector, wherein said rotating polygon mirror comprises a plurality of mirror surfaces, said control means adjusting the intensity of said light beam for each of said mirror surfaces, wherein said control means comprises:

an automatic power control circuit for controlling an intensity of said light beam emitted by said semiconductor laser, and means for selectively connecting said automatic power control circuit to a reference voltage and to circuitry providing a signal corresponding to an output of said photodetector in accordance with said output of said photodetector.

* * * * *